US012684566B2

(12) United States Patent
Banerjee et al.

(10) Patent No.: US 12,684,566 B2
(45) Date of Patent: Jul. 14, 2026

(54) REDUCING INTERFERENCE IN A COMMUNICATIONS NETWORK

(71) Applicant: Telefonaktiebolaget LM Ericsson (publ), Stockholm (SE)

(72) Inventors: Serene Banerjee, Chennai (IN); Joy Bose, Bangalore (IN); Ranjani H G, Bangalore (IN); Venkatesh Umaashankar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 300 days.

(21) Appl. No.: 18/287,855

(22) PCT Filed: Apr. 27, 2021

(86) PCT No.: PCT/IN2021/050409
§ 371 (c)(1),
(2) Date: Oct. 20, 2023

(87) PCT Pub. No.: WO2022/229967
PCT Pub. Date: Nov. 3, 2022

(65) Prior Publication Data
US 2024/0196392 A1      Jun. 13, 2024

(51) Int. Cl.
*H04W 72/1268*      (2023.01)
*H04B 17/336*      (2015.01)
*H04W 72/541*      (2023.01)

(52) U.S. Cl.
CPC ...... *H04W 72/1268* (2013.01); *H04B 17/336* (2015.01); *H04W 72/541* (2023.01)

(58) Field of Classification Search
CPC ............ H04W 72/1268; H04W 72/541; H04B 17/336; H04B 17/204; H04B 1/525; H04B 1/0475
(Continued)

(56) References Cited

U.S. PATENT DOCUMENTS 10,200,980 B2      2/2019   Koo et al.
11,503,610 B2 *   11/2022  Wang ................... H04J 11/0059
(Continued)

FOREIGN PATENT DOCUMENTS

EP      2552165 B1    12/2016
TW      I477097 B     3/2015

OTHER PUBLICATIONS

International Search Report and Written Opinion of the International Searching Authority, PCT/IN2021/050409, mailed Aug. 23, 2021, 13 pages.
(Continued)

*Primary Examiner* — Candal Elpenord
(74) *Attorney, Agent, or Firm* — Sage Patent Group

(57) ABSTRACT
A computer implemented method for reducing interference experienced at a first frequency due to transmissions made at one or more of a plurality of candidate frequencies. The method includes i) dividing the candidate frequencies into a first subset of candidate frequencies and a second subset of candidate frequencies; ii) blanking the first subset of candidate frequencies; and iii) determining whether the interference experienced at the first frequency is due to transmissions made on the first subset of candidate frequencies, dependent on whether said interference is reduced as a result of blanking the first subset of candidate frequencies.

20 Claims, 5 Drawing Sheets

200

(58) Field of Classification Search
USPC ................................................ 370/329–330
See application file for complete search history.

(56) References Cited

U.S. PATENT DOCUMENTS

| | | | | |
|---|---|---|---|---|
| 12,120,052 | B2 * | 10/2024 | Tsui ...................... | H04L 5/0048 |
| 2011/0151790 | A1 | 6/2011 | Khandekar et al. | |
| 2015/0358989 | A1 * | 12/2015 | Ni ......................... | H04B 7/024 |
| | | | | 370/330 |
| 2016/0034823 | A1 | 2/2016 | Farkas et al. | |
| 2016/0149659 | A1 | 5/2016 | Palanki et al. | |
| 2016/0302209 | A1 * | 10/2016 | Behravan ............ | H04W 72/541 |
| 2017/0033907 | A1 * | 2/2017 | Guan ................... | H04L 5/0005 |
| 2017/0251484 | A1 * | 8/2017 | Negus .................. | H04L 5/0073 |
| 2018/0213557 | A1 * | 7/2018 | He ........................ | H04W 74/04 |
| 2019/0052294 | A1 | 2/2019 | Abdemonem | |
| 2020/0120669 | A1 * | 4/2020 | Chen .................... | H04L 5/0037 |
| 2021/0105107 | A1 * | 4/2021 | Khirallah .............. | H04W 72/27 |
| 2022/0039064 | A1 * | 2/2022 | Raghavan ........... | H04W 72/046 |
| 2024/0349264 | A1 * | 10/2024 | Liu ........................ | H04L 25/02 |

OTHER PUBLICATIONS

Chan, Fan, "Passive Inter-modulation Cancellation in FDD System," Master Thesis in Wireless Communication, Faculty of Engineering, Lund University and Radio System, Ericsson, AB, Lund, Mar. 2017, 55 pages.

Extended European Search Report, European Patent Application No. 21939162.0, mailed Nov. 25, 2024, 6 pages.

Hattab, G., et al., "Inter-tier Interference Mitigation in Multi-Antenna HetNets: A Resource Blanking Approach," 2016 IEEE Global Communications Conference (GLOBECOM) Dec. 4, 2016 (XP033058639) 6 pages.

* cited by examiner

100

102

104

106

200

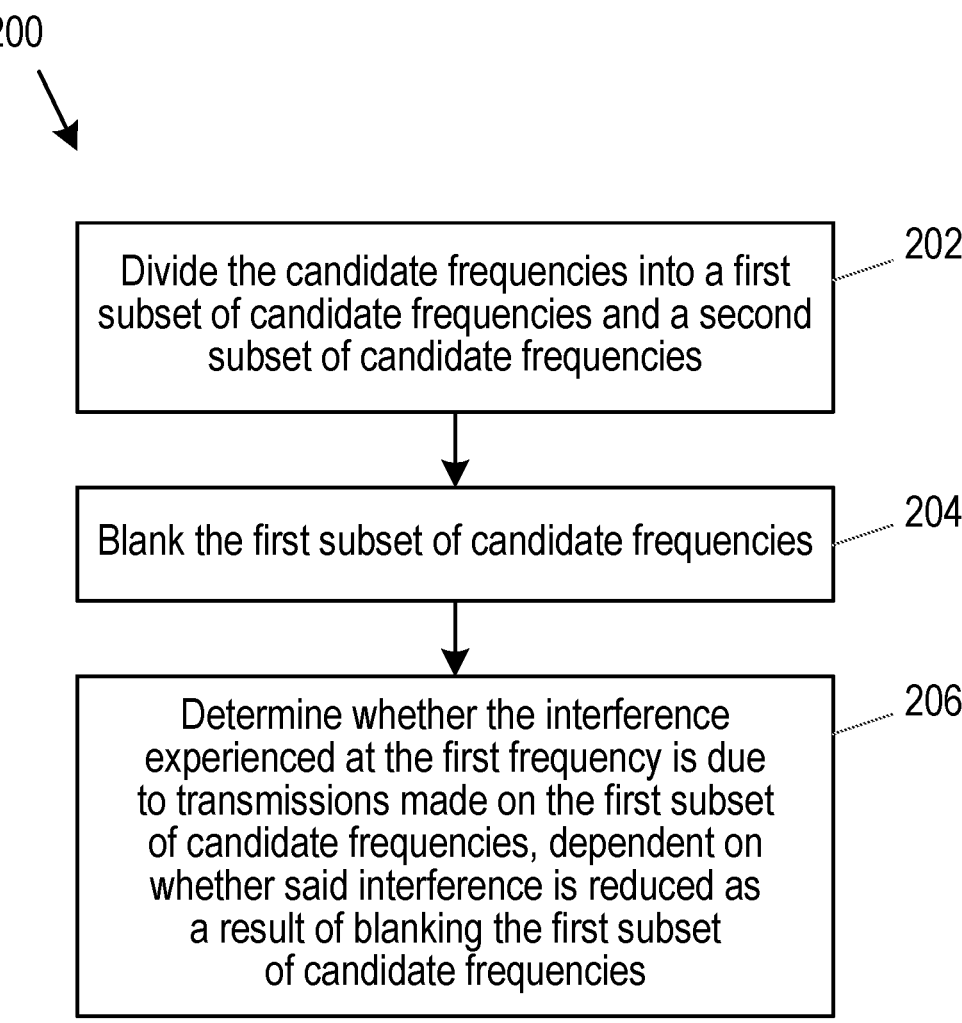

202

Divide the candidate frequencies into a first subset of candidate frequencies and a second subset of candidate frequencies

204

Blank the first subset of candidate frequencies

206

Determine whether the interference experienced at the first frequency is due to transmissions made on the first subset of candidate frequencies, dependent on whether said interference is reduced as a result of blanking the first subset of candidate frequencies

Fig. 2

REDUCING INTERFERENCE IN A COMMUNICATIONS NETWORK

CROSS-REFERENCE TO RELATED APPLICATIONS

This application is a 35 U.S.C. § 371 national stage application of PCT International Application No. PCT/IN2021/050409 filed on Apr. 27, 2021, the disclosure and content of which is incorporated by reference herein in its entirety.

TECHNICAL FIELD

This disclosure relates to methods, nodes and systems in a communications network. More particularly but non-exclusively, the disclosure relates to reducing interference experienced at a first frequency due to transmissions made at one or more of a plurality of candidate frequencies.

BACKGROUND

In a communications network (e.g. telecommunications network), uplink reception quality is generally dependent upon the signal to noise ratio (SINR), which is also dependent upon uplink noise. Uplink noise can vary with time and by cell. Time-variant and bursty uplink noise sources typically vary with network load. These sources include interference due to UEs served by neighboring cells as well as interference due to passive intermodulation (PIM). PIM is a form of intermodulation distortion whereby downlink transmitters mix to yield uplink interference.

PIM is a growing issue for cellular network operators. It occurs when old equipment rusts out, and sub-carriers intermix amongst themselves to cause interference in the uplink. This interference degrades uplink communication. Intermodulation between frequency components forms additional components at the sum and difference frequencies of the original frequencies and at sums and differences of multiples of those frequencies. For example, for two downlink frequencies, F1, F2, the combination of downlink frequencies can give rise to PIM in the uplink at frequencies of $F_{PIM}=aF1+bF2$.

Dynamic interference sources such as PIM are addressed by dynamic link adaptation mechanisms which configure scheduling grants, MCS (modulation coding schemes) and other radio parameters per transmission time interval (TTI), every millisecond. These sources include active components in the radio path including external interferers, distributed antenna systems and repeaters/coverage enhancers.

PIM can be a major concern for operators in communications networks, as it's effects are pronounced with:
a) Carrier aggregation
b) Rising downlink power and feeble and sensitive uplink reception
c) Aging of metal components
d) Changes in temperature and weather conditions
e) Changes in environmental conditions, and
f) Many passive components having non-linear characteristics being placed close to the antennas.

In addition to communications networks, PIM occurs in other fields of technology. For example, PIM may affect hearing aid devices. Two ambient sound frequencies F1 an F2 can mix to cause PIM interference at a third frequency. This can cause problems if the user of the hearing device wants to hear sounds at the third frequency.

It is an object of the disclosures herein to provide methods and systems for the mitigation of interference such as PIM in the fields of communications networks, and others.

SUMMARY

Generally, current methods in this area, as described above, assume that interference such as PIM can be reliably predicted and compensated for using e.g. simulation and/or ML models. However, in reality PIM may be transient or changeable. Furthermore, PIM may arise from environmental unknowns e.g. due to DL frequencies operated by other operators and/or environmental artefacts (billboards, other metal objects etc). Current methods assume that environmental PIM is negligible, however in practice, as noted above, this seems to be a simplistic assumption.

It is thus an object of embodiments herein to improve upon this situation by providing improved systems and methods for mitigating interference such as PIM, particularly PIM due to transient and/or environmental factors as well as PIM caused by DL frequencies operated by other operators.

According to a first aspect there is a computer implemented method for reducing interference experienced at a first frequency due to transmissions made at one or more of a plurality of candidate frequencies. The method comprises i) dividing the candidate frequencies into a first subset of candidate frequencies and a second subset of candidate frequencies; ii) blanking the first subset of candidate frequencies; and iii) determining whether the interference experienced at the first frequency is due to transmissions made on the first subset of candidate frequencies, dependent on whether said interference is reduced as a result of blanking the first subset of candidate frequencies.

According to a second aspect there is a computing apparatus for reducing interference experienced at a first frequency due to transmissions made at one or more of a plurality of candidate frequencies wherein the computing apparatus is adapted to: i) divide the candidate frequencies into a first subset of candidate frequencies and a second subset of candidate frequencies; ii) blank the first subset of candidate frequencies; and iii) determine whether the interference experienced at the first frequency is due to transmissions made on the first subset of candidate frequencies, dependent on whether said interference is reduced as a result of blanking the first subset of candidate frequencies.

According to a third aspect there is an apparatus for reducing interference experienced at a first frequency due to transmissions made at one or more of a plurality of candidate frequencies. The apparatus comprises: a memory comprising instruction data representing a set of instructions; and a processor configured to communicate with the memory and to execute the set of instructions. The set of instructions, when executed by the processor, cause the processor to: i) divide the candidate frequencies into a first subset of candidate frequencies and a second subset of candidate frequencies; ii) blank the first subset of candidate frequencies; and iii) determine whether the interference experienced at the first frequency is due to transmissions made on the first subset of candidate frequencies, dependent on whether said interference is reduced as a result of blanking the first subset of candidate frequencies.

According to a fourth aspect there is a node in a communications network comprising the apparatus of the second or third aspects.

According to a fifth aspect there is a hearing aid comprising the apparatus of the second or third aspects.

According to a sixth aspect there is a computer program comprising instructions which, when executed on at least one processor, cause the at least one processor to carry out a method according to the first aspect.

According to a seventh aspect there is a carrier containing a computer program according to the sixth aspect, wherein the carrier comprises one of an electronic signal, optical signal, radio signal or computer readable storage medium.

According to an eighth aspect there is a computer program product comprising non transitory computer readable media having stored thereon a computer program according to the sixth aspect.

Thus, embodiments of the disclosure described herein allow interference causing frequencies to be determined from a list of candidate frequencies in a manner similar to a binary search. This can be used e.g. in a live communications system to isolate which frequencies (if any) from a candidate frequency list are causing PIM.

As described above, each operator operating in a communications network can independently use supervised learning and/or reinforcement learning algorithms to predict combinations of downlink frequencies that give rise to PIM in the uplink. However, in practice, two operators are not likely to be sharing their DL frequency usage lists. So, once in operation, there will be environmental unknowns that an individual operator could not anticipate. In such cases, the proposed methods herein can narrow down and check at run time, if any of its own frequency allocation is the cause of the problem. So, the proposed method is particularly applicable once the operators test presence/absence of PIM under practical settings.

Using the methods herein, PIM causing frequencies can be determined in a live communications environment, even when the PIM is caused by transient or environmental factors, beyond the control of the operator in question. Actions to reduce the PIM can then be performed and this improves reliability and cuts costs in the network. To summarise, embodiments herein provide a system and framework for predicting frequencies that are causing throughput degradation, given environmental unknowns.

BRIEF DESCRIPTION OF THE DRAWINGS

For a better understanding and to show more clearly how embodiments herein may be carried into effect, reference will now be made, by way of example only, to the accompanying drawings, in which:

FIG. 2 shows a method according to some embodiments herein;

DETAILED DESCRIPTION

Figure 1:
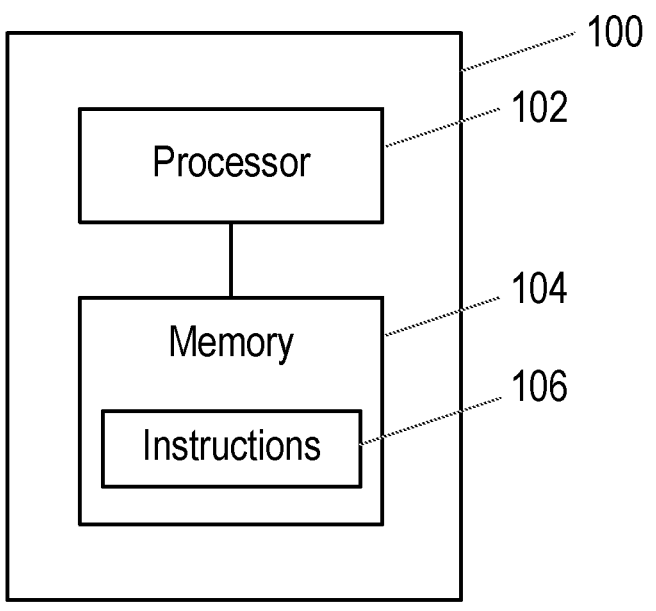
FIG. 1 shows a node according to some embodiments herein.

As described above, PIM caused by transmission on two downlink channels can cause interference on the uplink. It is desirable to be able to determine which downlink frequency combinations give rise to PIM, in order to mitigate their effects.

In a live communications system, for PIM avoidance, load-stress tests can be performed with Artificial Load Generators (AILG). For example, hardware placed between the baseband and radio unit may be used to artificially generate load on particular frequencies to determine which frequency combinations give rise to PIM. Such tests may be performed during maintenance windows to find table of frequencies that generate PIM artifacts. Field engineers may also perform maintenance works e.g. tighten loose nuts/bolts and re-test in order to reduce the determined PIM.

In addition to such maintenance testing, adaptive filtering as described e.g. in the thesis by Chen Fan, entitled "Passive Inter-modulation Cancellation in FDD System", Master's thesis, Lund University and Ericsson, 2017 can be used to detect trouble frequency combinations that could give rise to PIM.

Supervised learning and reinforcement learning techniques can also be used to predict PIM causing frequencies.

With adaptive filtering and supervised/reinforcement learning it is also possible to cancel the resulting PIM artifacts, too. However, these methods generally assume that environmental unknowns are zero, which in this disclosure is believed to be a simplistic solution. Gaps in the state-of-the-art therefore include that:

Temporary metal objects (such as billboards, etc.) can give rise to transient PIM which cannot necessarily be reliably predicted using adaptive filtering or machine learning methods.

Maintenance testing is performed by individual operators on their downlink frequencies. However PIM can arise between frequencies operated by different operators and the different operators may not share their frequency usage lists to perform accurate offline testing. This can thus make maintenance routines that work from an individual operator's list of DL frequencies of limited value.

Where frequency hopping is employed (e.g. for security purposes), the sub-carrier frequencies being used will dynamically change. This can result in frequency combinations giving rise to PIM, as determined e.g. in maintenance windows being no longer valid.

Inter-engineer decision-making variability is possible whereby Engineers make decisions that are not consistent with domain knowledge. For example, a drop in throughput may be due to PIM, but an Engineer may go ahead an increase the power thinking it is a power problem and that will fix the throughput. In such circumstances, this action further degrades the throughput. Software-driven solutions, as described above, are unable to compensate for such actions.

During operation, cells may have different utilization to what was predicted or simulated as described above, and hence PIM (as predicted using the methods described above) may not actually occur. As an example, say, frequency combination f1 and f2 are determined during the maintenance window to be a problem. But, to be a problem during real operation, both f1 and f2, should be loaded close to 100%. In other words, if not too many user equipments are using f1 and f2, then in real life, it will not cause PIM problems. So, during operation, PIM will be seen only when that particular frequency is loaded.

Generally, current methods in this area, as described above, assume that interference such as PIM can be reliably predicted and compensated for using e.g. simulation and/or ML models. However, in reality PIM may be transient or changeable. Furthermore, PIM may arise from environmental unknowns e.g. due to DL frequencies operated by other operators and/or environmental artefacts (billboards, other metal objects etc). Current methods assume that environmental PIM is negligible, however in practice, as noted above, this seems to be a simplistic assumption. The systems and methods herein therefore aim to improve upon these issues.

Aspects of the disclosure herein relate to a communications network (or telecommunications network). A communications network may comprise any one, or any combination of: a wired link (e.g. ASDL) or a wireless link such as Global System for Mobile Communications (GSM), Wideband Code Division Multiple Access (WCDMA), Long Term Evolution (LTE), New Radio (NR), WiFi, Bluetooth or future wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

FIG. 1 illustrates a network node 100 in a communications network according to some embodiments herein. Generally, the node 100 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 100 is configured (e.g. adapted, operative, or programmed) to perform any of the embodiments of the method 200 as described below. It will be appreciated that the node 100 may comprise one or more virtual machines running different software and/or processes. The node 100 may therefore comprise one or more servers, switches and/or storage devices and/or may comprise cloud computing infrastructure or infrastructure configured to perform in a distributed manner, that runs the software and/or processes.

The node 100 may comprise a processor (e.g. processing circuitry or logic) 102. The processor 102 may control the operation of the node 100 in the manner described herein. The processor 102 can comprise one or more processors, processing units, multi-core processors or modules that are configured or programmed to control the node 100 in the manner described herein. In particular implementations, the processor 102 can comprise a plurality of software and/or hardware modules that are each configured to perform, or are for performing, individual or multiple steps of the functionality of the node 100 as described herein.

The node 100 may comprise a memory 104. In some embodiments, the memory 104 of the node 100 can be configured to store program code or instructions 106 that can be executed by the processor 102 of the node 100 to perform the functionality described herein. Alternatively or in addition, the memory 104 of the node 100, can be configured to store any requests, resources, information, data, signals, or similar that are described herein. The processor 102 of the node 100 may be configured to control the memory 104 of the node 100 to store any requests, resources, information, data, signals, or similar that are described herein.

It will be appreciated that the node 100 may comprise other components in addition or alternatively to those indicated in FIG. 1. For example, in some embodiments, the node 100 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 102 of node 100 may be configured to control such a communications interface to transmit to and/or receive from other nodes or network functions requests, resources, information, data, signals, or similar.

Briefly, in one embodiment, the node 100 may be configured for reducing interference experienced at a first frequency due to transmissions made at one or more of a plurality of candidate frequencies. The node may be adapted to i) divide the candidate frequencies into a first subset of candidate frequencies and a second subset of candidate frequencies; ii) blank the first subset of candidate frequencies; and iii) determine whether the interference experienced at the first frequency is due to transmissions made on the first subset of candidate frequencies, dependent on whether said interference is reduced as a result of blanking the first subset of candidate frequencies.

In this manner the node 100 may be used to hone in on frequencies that cause interference on the first frequency.

The node may be operated by an operator or vendor acting in the communications network, as described below. The node 100 may operate various downlink channels at various frequencies as well as one or more uplink channels. There may be other nodes in the communications network operated by other operators/vendors. The other nodes may operate various downlink channels at different frequencies to those of the node 100, and these may cause PIM on the uplink channel of the node 100. PIM may also be caused on the uplink of the node 100 by environmental factors as described above.

Turning to FIG. 2 there is a method 200 for reducing interference experienced at a first frequency due to transmissions made at one or more of a plurality of candidate frequencies. The method 200 comprises in a first step 202: i) dividing the candidate frequencies into a first subset of candidate frequencies and a second subset of candidate frequencies; in a second step 204: ii) blanking the first subset of candidate frequencies; and in a third step 206: iii) determining whether the interference experienced at the first frequency is due to transmissions made on the first subset of candidate frequencies, dependent on whether said interference is reduced as a result of blanking the first subset of candidate frequencies.

The method 200 may be performed by a node in a communications system such as the node 100 described above.

More generally, the method 200 may be performed by a computing apparatus. Such a computing apparatus may comprise a memory comprising instruction data representing a set of instructions, and a processor configured to communicate with the memory and to execute the set of instructions. In such embodiments, the set of instructions, when executed by the processor, may cause the processor to perform the method 200. A memory, processor and set of instructions were described above with respect to the node 100 and the detail therein will be understood to apply equally to a computing apparatus.

Such an apparatus may form part of a larger computing apparatus or device. For example, as will be described in more detail below, an apparatus configured to perform the method 200 may be implemented in a hearing aid.

In more detail, the method 200 may be used to determine which (if any) of a plurality of candidate frequencies are causing interference on a first frequency.

In embodiments where the method is performed in a communications network, the method 200 may be used to determine which of a plurality of candidate downlink frequencies (e.g. downlink channels) is causing interference at a first uplink frequency (or first uplink channel).

The interference may be due to Passive Intermodulation (PIM) as described above. PIM occurs as an artefact of transmissions on a first frequency channel F1 and a second frequency channel F2. Three possible PIM generation scenarios are as follows. In case 1, both F1 and F2 are channels operated on by the operator of the node 100. In case 2, one of the frequencies, F1, is operated on by the operator of the node 100, whilst the second frequency F2 is not a frequency operated on by the operator of the node 100. As such F2 may be a frequency operated on by another operator (e.g. vendor) on the communications network, or F2 may arise due to environmental effects (billboards etc as described above). In a third case, both F1 and F2 are frequencies not operated on by the operator of the node 100 e.g. the transmissions on frequencies F1 and F2 may both be due to environmental effects, or may both be due to DL transmissions made on frequencies operated on by other operator(s). For example, PIM may be experienced at a first UL frequency of the operator of the node 100, yet the PIM is due to transmissions made on frequencies F1 and F2 by other operator(s) and/or the environment.

In such embodiments, the plurality of candidate frequencies may comprise frequencies being used for downlink transmissions by the operator of the node. The first frequency may be a frequency used for uplink transmissions by the operator of the node. In some embodiments, the method 200 may be performed responsive to a network node 100 determining that there is PIM (or other interference) on a first (uplink) frequency.

Generally, the plurality of candidate frequencies may comprise a list of (individual) frequencies, a range of frequencies (e.g. a frequency range), or any combination of one or more individual frequencies and/or one or more frequency ranges.

The candidate frequencies may comprise one or more frequencies or frequency ranges historically known to cause interference on the first frequency. These may have been determined for example, by machine learning models or reinforcement learning models as described above, through simulation, by experimentation during previous maintenance procedures and/or by previous performance of the method 200.

In embodiments in a communications network, the candidate frequencies may comprise a list of downlink frequencies used by the operator (e.g. vendor) of the node. In other words, a list of downlink frequencies corresponding to channels that the operator of the node has control over.

In step 202 the method 200 comprises dividing the candidate frequencies into a first subset of candidate frequencies and a second subset of candidate frequencies.

In some embodiments, the candidate frequencies are searched in the manner of a binary search whereby the candidate frequencies are ordered in ascending or descending order and then split into two. Put another way, step i) may comprise dividing an ordered list of the plurality of candidate frequencies in half. The first subset of candidate frequencies may thus correspond to the first half of the ordered list of the plurality of candidate frequencies and the second subset of candidate frequencies may thus correspond to the second half of the ordered list of the plurality of candidate frequencies.

In embodiments where the plurality of candidate frequencies comprises a frequency range, the first subset of frequencies may comprise a first portion of the frequency range and the second subset of frequencies may comprise a second portion of the frequency range. For example, the frequency range may be split in half and the first subset of candidate frequencies may comprise a first half of the frequency range and the second subset of candidate frequencies may comprise the second half of the frequency range.

It will be appreciated however that these are merely examples, and that the candidate frequencies may be split into first and second subsets in a wide variety of different ways. For example, the candidate frequencies may be split into a first subset comprising frequencies that are historically known to cause PIM at the first frequency and a second subset of candidate frequencies that are historically not associated with causing PIM at the first frequency.

In step 204 the method 200 then comprises ii) blanking the first subset of candidate frequencies. In other words, ceasing to transmit on any channels corresponding to the first subset of candidate frequencies.

In embodiments where the plurality of candidate frequencies comprise a frequency range, step 204 may comprise blanking a first portion of the frequency range. In some embodiments, step 204 may comprise blanking a first half of the frequency range.

In step 206 the method 200 then comprises iii) determining whether the interference experienced at the first frequency is due to transmissions made on the first subset of candidate frequencies, dependent on whether said interference is reduced as a result of blanking the first subset of candidate frequencies.

Step 206 may comprise measuring the interference on the first frequency (e.g. interference on a first uplink channel) whilst the first subset of candidate frequencies are blanked. If blanking the first subset of frequencies reduces or eliminates the interference experienced then this may indicate that it is transmission on one or more of the first subset of frequencies that is causing the interference.

Thus, in some embodiments, step iii) comprises determining 206 that the interference experienced at the first frequency is due to transmissions made on the first subset of candidate frequencies if the interference experienced at the first frequency is reduced as a result of blanking the first subset of candidate frequencies.

Conversely, the first subset of frequencies can be eliminated from causing the interference if blanking them does not reduce or eliminate the PIM. As such, step iii) may comprise: determining that the interference experienced at the first frequency is not due to transmissions made on the first subset of candidate frequencies if the interference experienced at the first frequency is not reduced as a result of blanking the first subset of candidate frequencies.

The method may then be repeated in an iterative manner, by updating the list of candidate frequencies with whichever of the first or second subset of frequencies that is determined to contain (frequencies) that are causing the interference, and repeating steps i), ii) and iii) iteratively until one or more singleton frequencies (e.g. individual frequencies) are determined.

As such, in some embodiments, the method 200 may further comprise: determining that the interference experienced at the first frequency is due to transmissions made on the second subset of candidate frequencies; and repeating steps i), ii) and iii) for third and fourth subsets of the second subset of candidate frequencies. For the avoidance of doubt, this may comprise dividing the second subset of candidate frequencies into a third subset of candidate frequencies and a fourth subset of candidate frequencies, blanking the third subset of candidate frequencies; and determining whether the interference experienced at the first frequency is due to transmissions made on the third subset of candidate frequencies, dependent on whether said interference is reduced as a result of blanking the third subset of candidate frequencies. The method 200 may further comprise repeating steps i), ii) and iii) in an iterative manner for subsequent subsets of candidate frequencies until one or more individual frequencies causing the interference are determined.

As described above, in embodiments where the method is performed in a communications network, three outcomes of the method 200 are as follows.

Case 1. Two frequencies are found, F1 and F2, the combination of which result in PIM on the first UL channel, $F_{UL}$. In this case, the method may further comprise using a noise cancellation process to cancel the interference experienced at the first UL frequency due to the determined one or more individual frequencies. For example, a noise cancellation node or module may be used to transmit a frequency such that the effect of the PIM causing frequency is neutralized.

Case 2. The method 200 may output a single frequency F1 that is combining with a second, unknown frequency F2 to cause PIM on the first UL frequency, $F_{UL}$. In this example, the unknown frequency F2 may be a frequency used by other operator(s) or a frequency due to environmental factors (billboards, rusting equipment, loose screws etc). In such a case it may not be possible to cancel the PIM and thus it may be better that the frequency F1 is avoided. In this example therefore, the method may further comprise using a different downlink frequency to the determined PIM causing frequency (F1).

More generally, the method 200 may thus comprise determining that the PIM is caused by the one of more individual downlink frequencies, and using different downlink frequencies for subsequent transmissions (e.g. in order to avoid generation of PIM entirely).

Case 3. In some embodiments, the method 200 may comprise repeating steps i), ii) and iii) in an iterative manner for subsequent subsets of candidate frequencies until all frequencies in the plurality of candidate frequencies have been eliminated. For example, if blanking the first subset of candidate frequencies and the second subset of candidate frequencies the plurality of candidate frequencies does not result in a reduction in PIM, then none of the candidate frequencies are causing the PIM. In this case, F1 and F2 are either channels used by other operator(s), or are caused by environmental factors as described above.

In case 3, the plurality of candidate frequencies could also be ruled out as causing PIM by blanking out all of the candidate frequencies in one go. However this would result in a time window where the operator cannot transmit anything. This could slow down some user equipment communications, for example, those that need ultra-low latency. In such cases, the use of the method 200 (e.g. a binary search) allows transmissions to continue unaffected whilst the plurality of candidate frequencies are eliminated as sources of PIM.

In this case, the method 200 may comprise determining that the PIM is caused by the environment and that a different uplink frequency should be used e.g. in order to avoid the first UL frequency which is affected by PIM. This may be performed by a frequency changing module or node that changes the frequency of the network to avoid the PIM causing frequency.

In one embodiment, where the method is for use in determining which frequencies are causing PIM on a first frequency which is a first uplink frequency $F_{UL}$, the three cases described above are handled as follows:

Case 1: For a given UL PRB block, the $F_1$ and $F_2$ PIM causing components in DL PRB are unknown and from same operator:

Given $F_{UL}$, use the historical knowledge to narrow down the search space (for candidate $F_1$ and $F_2$ components) from entire DL PRB sub carrier frequencies to a subset of tuples, represented as $\mathcal{F}_{12}$. If there is no historical knowledge, all DL PRB sub carrier frequencies of the operator can be considered Among the candidate $\mathcal{F}_{12}$ components, use binary search to arrive at the correct component. The algorithm can be summarized as:

Step 1: Blank one half of the $\mathcal{F}_{12}$ candidates, check if PIM in $F_{UL}$ has reduced Step 2: If PIM reduced Search space $\mathcal{F}_{12}$ is updated to first half, proceed to step 1

Step 3: Update $\mathcal{F}_{12}$ to second half, proceed to step 1

Stop when $\mathcal{F}_{12}$ is a singleton set

Pass ($F_1$, $F_2$) to PIM cancellation module using RL/adaptive filtering. The advantage of a solution here is that both the DL PRB and UL PRB continues to be in use.

Case 2: For a given UL PRB block, only one component i.e., $F_1$ is from DL PRB of same operator and the other is from another operator or unknown environment:

Given $F_{UL}$, the historical knowledge is considered to narrow down the search space (for only candidate $F_1$ components) from entire DL PRB sub carrier frequencies to a subset of tuples, represented as $\mathcal{F}_1$.

Among the candidate $\mathcal{F}_1$ carriers, use binary search to arrive at the correct component. The algorithm can be summarized as:

Step 1: Blank one half of the $\mathcal{F}_1$ candidates, check if PIM in $F_{UL}$ has reduced Step 2: If PIM reduced Search space $\mathcal{F}_1$ is updated to first half, proceed to step 1

Step 3: Update $\mathcal{F}_1$ to second half, proceed to step 1

Stop when $\mathcal{F}_1$ is a singleton set

Pass ($F_1$) to frequency shift module where the particular DL PRB is ceased to be used. In this solution, UL PRB continues to be in use.

Case 3: Both is ($F_1$, $F_2$) are not in the operator's range:

Cease to use $F_{UL}$ as UL PRB and shift to another PRB

Append the output of the PIM frequency determining module back to the historical knowledge of $F_{UL}$.

In some embodiments, following on from this, a historically built binary search tree could be built to further speed-up the search process. A binary search tree is built based on historical binary search patterns. For example, without any prior knowledge (e.g. at a cold start), the method 200 may be performed (e.g., a binary search may be performed) to determine a PIM causing frequency. The result can be saved based on time of the day or traffic on the node. So, next time, if the time of the day or traffic match, there is no need for a full binary search again, rather the binary search tree can help locate the problem. So, based on history, the binary search tree helps to narrow down the problem. Another example is smart bookkeeping. That is, problem frequencies may be recorded and tracked, based on traffic and time of the day, and hence next time PIM recurs, using a search-efficient binary search tree or smart booking process, the problem can be resolved.

The tree could be also learnt using a machine learning (ML) model. Examples of suitable models include but are not limited to neural networks, random forest models and support vector machine models. As an example, the inputs of such an ML model could be: (a) time of the day, (b) traffic on node, (c) weather conditions, (d) trouble frequencies found during binary search (e.g. from a cold start). The output could be a model that learns from (a), (b), (c), (d) as inputs and outputs a PIM causing frequency. In such an example, each time the method 200 is performed, the output may be used as training data for a ML model. In this way the method may be used to identify PRBs from the proposed binary search and historically built binary search trees to see if any of them could be contributing towards PIM in the uplink.

Figure 3:
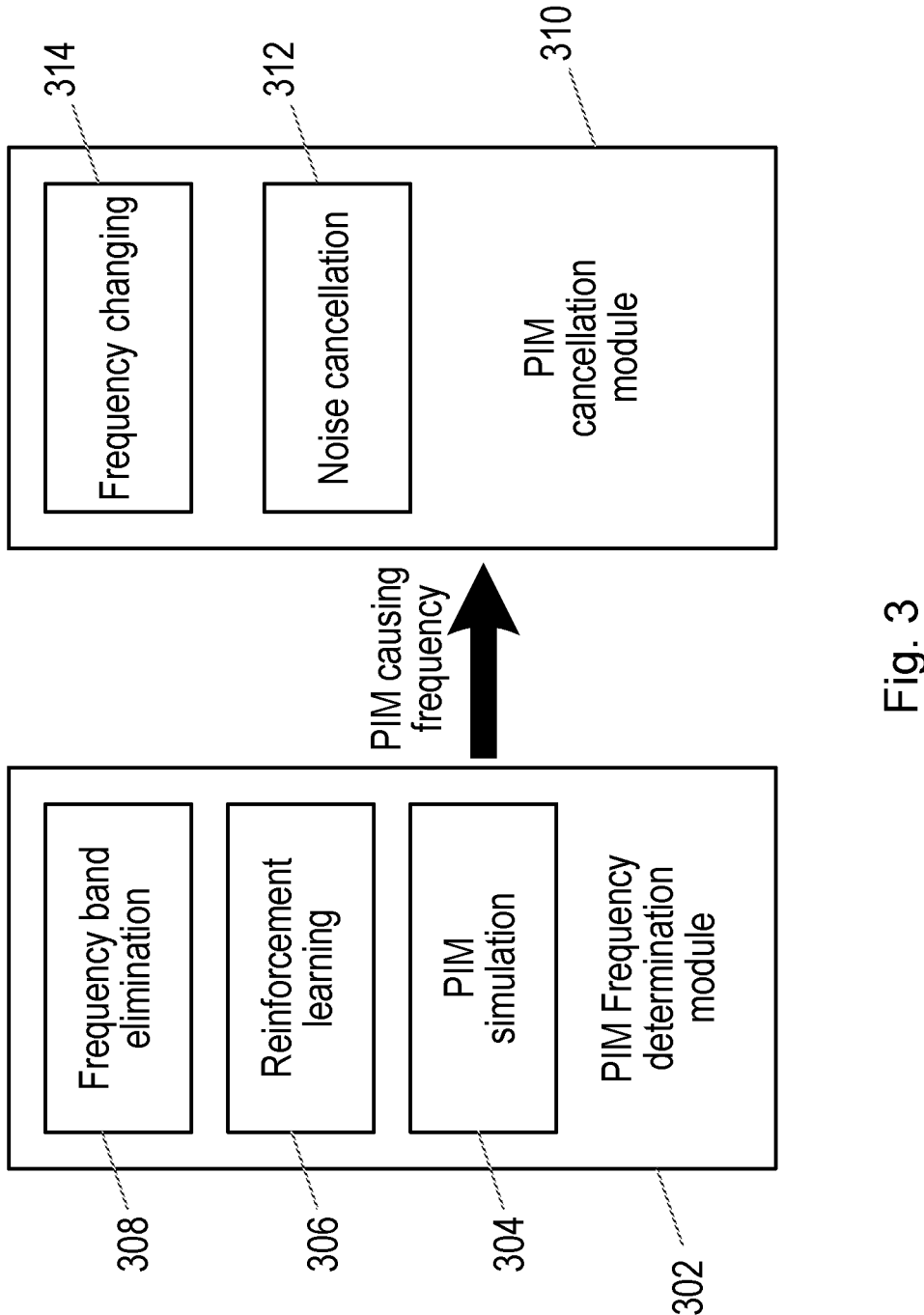
FIG. 3 shows an apparatus according to some embodiments herein.

Turning now to other embodiments, in one embodiment in a communications network, there is a computer implemented apparatus as shown in FIG. 3. The apparatus in FIG. 3 is for determining which of a plurality of (DL) candidate frequencies are combining to cause PIM on a first (UL) frequency. The apparatus has a PIM frequency determination module 302 that determines the PIM causing frequency(s) in real time. The PIM frequency determination module comprises a frequency band elimination module 308 that performs the method 200 as described above to perform a binary tree search to eliminate frequency bands that do not cause PIM. The PIM frequency module may further comprise complementary modules, such as a reinforcement learning agent 306 that can predict PIM causing frequencies (according to the known methods as described above). This produces small perturbations to the frequency of the network to identify at which frequency of the environment is the PIM caused. The PIM frequency determination module may further comprise a PIM simulation module 304 that can be used to simulate which combination(s) of DL frequencies cause PIM on a first uplink frequency. This simulates the network and environmental conditions to quickly identify the PIM causing frequencies in real time.

PIM cancellation module 310 cancels out the PIM that is determined by the PIM frequency determination module 302 using a combination of techniques such as noise cancellation through Noise cancellation module 312. This creates a frequency such that the effect of the PIM causing frequency is neutralized. Alternatively frequency avoidance can be used through Frequency changing module 314. This module changes the frequency of the network to avoid the PIM causing frequency.

Figure 4:
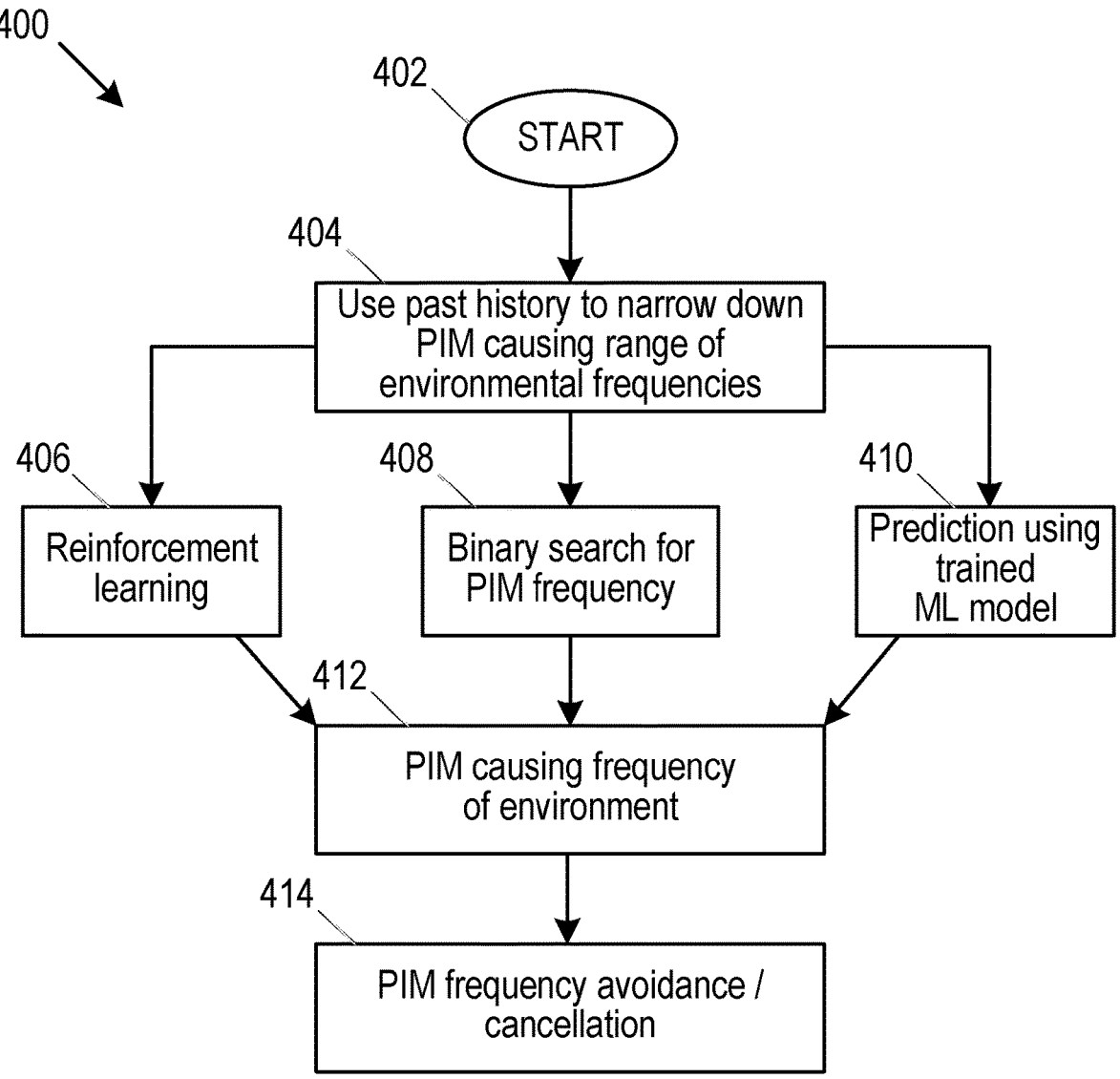
FIG. 4 shows a flow chart illustrating a method according to some embodiments herein.

The PIM cancellation module may perform a process as follows:

Given $(F_1, F_2)$ as determined by PIM frequency detection module:

Case1: $(F_1, F_2)$ both from given operator—PIM cancellation using continuous time adaptive filter (in RF domain) or using RL algorithms Case2: $F_1$ alone from given operator and $F_2$ is unknown, DL PRB corresponding to $F_1$ can be ceased to be used Case 3: $(F_1, F_2)$ neither are from given operator—frequency changing module for UL PRB FIG. 4 shows a flow chart illustrating a method according to some embodiments herein. The method 400 starts at 402. Candidate (PIM causing) frequencies are obtained and in step 404 past history is used to augment, or narrow down the candidate frequencies to ranges most likely to be causing the PIM.

In step 408 a binary search is performed according to the method 200 in order to search for a PIM frequency. This may be performed alongside (e.g. complementary to) searches for PIM causing frequencies using reinforcement learning methods 406 and/or predictions of the most likely PIM causing frequencies using machine learning models 410.

The skilled person will appreciate that this is an example however, and that different variations are possible. For example, steps 406 and 410 may be omitted from the method 400 described above and e.g. (just) the binary search method (method 200) may be performed in step 408.

The output of step 408 (e.g. the output of the method 200) is either an indication of one or more frequencies causing PIM 412, or an indication that no frequency has been found and thus that the PIM is caused solely by environmental factors and/or other DL channels of other operators. In the first case, in step 414 frequency cancellation may be used to cancel out the effects of the known frequency. In the second case, in step 414 frequency avoidance may be used, e.g. a different UL channel may be selected to avoid the PIM entirely.

In this way, PIM causing frequencies may be determined and/or avoided in a real time manner, even if the PIM is caused by environmental factors out of the control of the operator. This is advantageous compared to e.g. Reinforcement Learning methods that are typically used only in maintenance windows and are of limited application in cases where the PIM is environmental.

Figure 5:
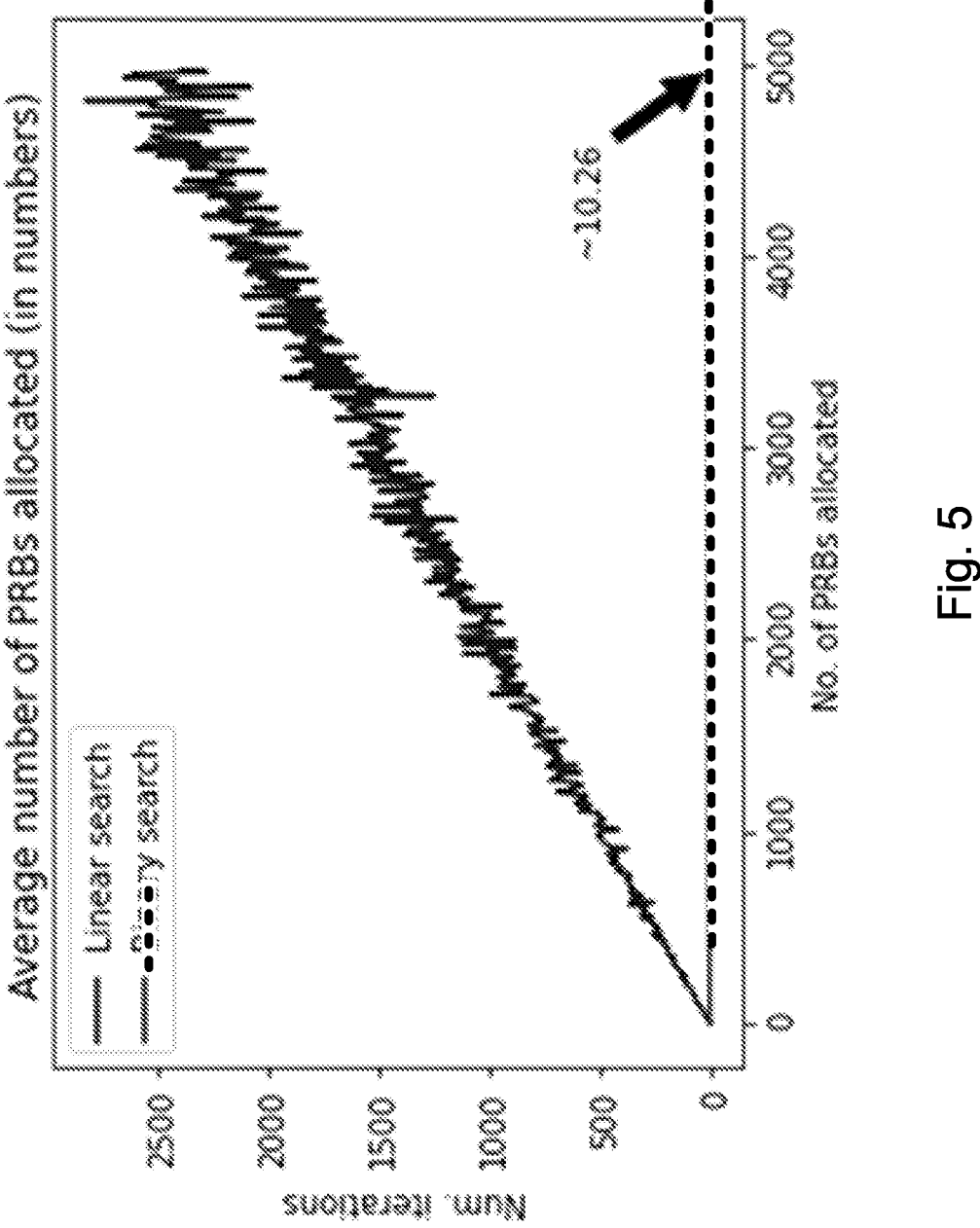
FIG. 5 shows efficiency gains associated with a binary search compared to a linear search method.

FIG. 5 illustrates the advantage in speed of binary search for up-to 5000 allocated PRBs. For example, if in a certain time instant, if 1000 downlink PRB blocks are active, then a linear search (complexity O(N)) with blanking one PRB per iteration (1 ms) would take 1000 ms. However, an equivalent binary search (complexity O(log N)) would take close to 12 ms. This proposed solution makes it amenable to detect the trouble frequencies even with frequency-hopping where the allocation is changing after a few milliseconds, for security reasons.

As a use case of the above, consider a case where a telecom operator O1 has a frequency F1 which comes within a certain frequency band. Now another operator O2 in the same region has a frequency F2, which is unknown to operator O1 (environmental unknown), also happens to come under the same frequency band. Now F1 and F2 together cause PIM which results in degradation of the channel quality. Therefore, operator O1 has to change its own frequency to avoid having PIM due to F2 frequency of O2. Applying the method 200, O1 first narrows down the range of PIM causing frequencies, using knowledge from past history, and on the narrowed range it performs a binary search and discovers that O2 has frequency F2 which will cause PIM if combined with F1. All this binary search computation and frequency changing is done in real time.

As another use case, consider multiple smart devices connected in an Internet-of-Things (IoT) settings in a Smart Home/Office scenario. As the clutter in the home/office or any other indoor setting is increased, and a limited number of frequencies are available to users, incidental PIMs can severely degrade quality. In this case also a quick selection of the best frequency is needed. In such scenarios, the method 200 can serve as a tool to localize to the best frequency in such settings as well.

In such an example, the method is performed by a first Internet of things, IoT, device, transmitting on a first frequency. The transmission of the first frequency may be experiencing PIM. The candidate frequencies may be transmission frequencies used by other IoT devices in the environment of the first IoT device. The method 200 above may be used to determine which of the frequencies used by other IoT devices are combining, either with each other, or with frequencies caused by e.g. clutter, and giving rise to PIM on the frequency used by the first IoT device.

In a further use case, because the solution is light-weight it is amenable to distributed node and/or cloud implementation. Various distributed processing options, that suit data source, storage, compute and coordination needs are possible. For example, data sampling may be done at the node (worker), with data analysis, inference, model creation, model sharing and PIM alert notification done from the cloud (master).

Turning now to other embodiments, although the foregoing has been largely described in terms of a communications network, the method 200 has applications to other fields of technology where interference on a first frequency is caused by one or more other frequencies. As an example, in some embodiments, the method 200 is performed by a hearing aid. In such embodiments, the plurality of candidate frequencies comprise ambient sound frequencies and the first frequency is a frequency of interest to the user of the hearing aid—e.g. a frequency that the user wishes to hear. In such an example, the method is for use in determining which ambient sound frequencies from a plurality of candidate sound frequencies are causing interference at a first sound frequency of interest to a user of the hearing aid. In such an embodiment the transmissions are sound transmissions.

With respect to a hearing aid, imagine a hearing aid is tuned for a particular patient in laboratory settings. Now, as the user moves or goes into different environmental settings the tuned coefficients of the noise cancellation filter will no longer be optimal. The brute force way would then be to tune the needed coefficients, either manually by the user himself/herself, or have a smarter auto-tuning algorithm. The proposed solution herein can help building a smarter auto-tuning algorithm. For example, if every values in the range of the coefficients need to be searched, the time complexity of the solution will increase. However, the proposed binary search can help reduce the search space to the order of N log N, thereby significantly reducing the search time.

Advantages of the methods and apparatuses above include that the system automatically detects which are the trouble frequencies that when changed could mitigate interference such as PIM, given environmental unknowns. PIM causing frequencies are narrowed down based on learnt historic patterns of interference and load by updating/compiling the candidate frequency list according to historical knowledge.

PIM mitigation in this manner can also reduce costs by enabling operators to quickly isolate and avoid trouble frequencies.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer implemented method for reducing interference experienced at a first frequency due to transmissions made at one or more of a plurality of candidate frequencies, the method comprising:

i) dividing the candidate frequencies into a first subset of candidate frequencies and a second subset of candidate frequencies;

ii) blanking the first subset of candidate frequencies; and iii) determining whether the interference experienced at the first frequency is due to transmissions made on the first subset of candidate frequencies, dependent on whether said interference is reduced as a result of blanking the first subset of candidate frequencies.

2. The method of claim 1 wherein step iii) comprises: determining that the interference experienced at the first frequency is due to transmissions made on the first subset of candidate frequencies if the interference experienced at the first frequency is reduced as a result of blanking the first subset of candidate frequencies.

3. The method of claim 1 wherein step iii) comprises: determining that the interference experienced at the first frequency is not due to transmissions made on the first subset of candidate frequencies if the interference experienced at the first frequency is not reduced as a result of blanking the first subset of candidate frequencies.

4. The method of claim 3 further comprising:

determining that the interference experienced at the first frequency is due to transmissions made on the second subset of candidate frequencies; and repeating steps i), ii) and iii) for third and fourth subsets of the second subset of candidate frequencies.

5. The method of claim 4 further comprising repeating steps i), ii) and iii) in an iterative manner for subsequent subsets of candidate frequencies until one or more individual frequencies causing the interference are determined.

6. The method of claim 5 further comprising:

using a noise cancellation process to cancel the interference experienced at the first frequency due to the determined one or more individual frequencies.

7. The method of claim 4 further comprising repeating steps i), ii) and iii) in an iterative manner for subsequent subsets of candidate frequencies until all frequencies in the plurality of candidate frequencies have been eliminated.

8. The method of claim 7 further comprising determining to use a different frequency to the first frequency.

9. The method of claim 1 wherein the plurality of candidate frequencies comprises frequencies that are historically known to cause interference on the first frequency.

10. The method of claim 1 wherein the plurality of candidate frequencies comprises a frequency range; and wherein the first subset of frequencies comprises a first portion of the frequency range and the second subset of frequencies comprises a second portion of the frequency range.

11. The method of claim 1 wherein step i) comprises dividing an ordered list of the plurality of candidate frequencies in half and wherein the first subset of candidate frequencies correspond to the first half of the ordered list of the plurality of candidate frequencies and the second subset of candidate frequencies correspond to the second half of the ordered list of the plurality of candidate frequencies.

12. The method of claim 1 wherein the method is performed by a node in a communications network and wherein the method is for use in determining which of a plurality of candidate downlink radio frequencies are causing Passive Intermodulation, PIM, at a first uplink radio frequency.

13. The method of claim 12 wherein the method comprises determining that the PIM is caused by the one of more individual downlink frequencies; and using different downlink frequencies for subsequent transmissions.

14. The method of claim 12 wherein the method comprises determining that the PIM is caused by an environment and that a different uplink frequency should be used.

15. The method of claim 12 wherein the plurality of candidate frequencies comprise frequencies being used for downlink transmissions by an operator of the node.

16. The method of claim 1 wherein the method is performed by a hearing aid and wherein the method is for use in determining which ambient sound frequencies from a plurality of candidate sound frequencies are causing interference at a first sound frequency of interest to a user of the hearing aid.

17. The method of claim 1 wherein the method is performed by a first Internet of things, IoT, device, transmitting on a first frequency and wherein the candidate frequencies are transmission frequencies used by other IoT devices in an environment of the first IoT device.

18. A computing apparatus for reducing interference experienced at a first frequency due to transmissions made at one or more of a plurality of candidate frequencies wherein the computing apparatus is adapted to:

i) divide the candidate frequencies into a first subset of candidate frequencies and a second subset of candidate frequencies;

ii) blank the first subset of candidate frequencies; and iii) determine whether the interference experienced at the first frequency is due to transmissions made on the first subset of candidate frequencies, dependent on whether said interference is reduced as a result of blanking the first subset of candidate frequencies.

19. The computing apparatus of claim 18 wherein determining that the interference experienced at the first frequency is due to transmissions made on the first subset of candidate frequencies if the interference experienced at the first frequency is reduced as a result of blanking the first subset of candidate frequencies.

20. An apparatus for reducing interference experienced at a first frequency due to transmissions made at one or more of a plurality of candidate frequencies, the apparatus comprising:

a memory comprising instruction data representing a set of instructions; and a processor configured to communicate with the memory and to execute the set of instructions, wherein the set of instructions, when executed by the processor, cause the processor to:

i) divide the candidate frequencies into a first subset of candidate frequencies and a second subset of candidate frequencies;

ii) blank the first subset of candidate frequencies; and iii) determine whether the interference experienced at the first frequency is due to transmissions made on the first subset of candidate frequencies, dependent on whether said interference is reduced as a result of blanking the first subset of candidate frequencies.

* * * * *